United States Patent [19]

Brömer et al.

[11] 4,214,192
[45] Jul. 22, 1980

[54] PATH CONTROL APPARATUS FOR THE COMPUTER DIRECTED CONTROL OF A NUMERICALLY CONTROLLED MACHINE TOOL

[75] Inventors: Günter Brömer, Erlangen-Spardorf; Horst Gose; Klaus-Rüdiger Hoffmann, both of Erlangen; Christian Seeliger, Grossenseebach b. Erlangen, all of Fed. Rep. of Germany

[73] Assignee: Siemens Aktiengesellschaft, Munich, Fed. Rep. of Germany

[21] Appl. No.: 862,423

[22] Filed: Dec. 20, 1977

[30] Foreign Application Priority Data

Dec. 27, 1976 [DE] Fed. Rep. of Germany ....... 2659090

[51] Int. Cl.² ............................................. G05B 19/24
[52] U.S. Cl. ...................................... 318/573; 318/571
[58] Field of Search ................................ 318/571, 573

[56] References Cited

U.S. PATENT DOCUMENTS

| | | | |
|---|---|---|---|
| 3,987,350 | 10/1976 | Pomella et al. | 318/571 |
| 4,078,195 | 3/1978 | Mathias et al. | 318/571 X |
| 4,079,235 | 3/1978 | Froyd et al. | 318/571 X |

Primary Examiner—B. Dobeck
Attorney, Agent, or Firm—Kenyon & Kenyon

[57] ABSTRACT

In path control apparatus for a numerically controlled machine tool, a computer determines the trajectory to be traversed in space, resolves the latter by way of interpolation into the axial increments of the individual feed axes and performs complete position control for each axis. The interpolation is accomplished by the method of direct function computation, using travel distance increments proportional to the trajectory velocity. The position control is designed as a discrete control and operates with the premise that the minimum total computing cycle time is shorter than the sampling time of the fastest position control loop required by the control system.

1 Claim, 4 Drawing Figures

PATH CONTROL APPARATUS FOR THE COMPUTER DIRECTED CONTROL OF A NUMERICALLY CONTROLLED MACHINE TOOL

BACKGROUND OF THE INVENTION

The invention relates to a path control apparatus for a computer-directed control of a numerically controlled machine tool in general and more particularly to an improved apparatus of this type.

Path control apparatus for numerically controlled machine tools with controlled drives in the feed axes, wherein a computer determines the trajectory to be traversed from input data are known. Such path control apparatus is described in SIEMENS-Zeitschrift 1966, pages 67–72.

FIG. 1 shows the structure of a known computer directed path control apparatus for a numerically controlled machine tool 9. The information, which is stored, for instance, on perforated tape or magnetic tape, is fed into a reference input computer 2 by a reader 1 during a programmed machining cycle. The reference input computer 2 decodes the information read in and determines therefrom the three dimensional trajectory of the path control. However, the variables determined by the reference input computer 2 are not suitable for setting the desired values for the position control loops directly. Instead, they must be interpolated in the controlled feed axes by an interpolator 3 which follows the reference input computer 2. The interpolator 3 determines reference values for the position control loops assigned to the individual feed axis drives. The position reference values determined by the interpolator 3 are compared in respective comparators 4 with the actual position values of the corresponding feed axes. The respective control difference drives the position controller 5 of the associated feed axis. The position controller 5 generates the reference input for a speed control loop comprising a speed controller 7 and the drive system 8 of the controlled feed axis. The speed reference values determined by the position control 5 are compared in a comparator 6 with the actual speed values of the drive system 8. The speed difference drives the speed controller 7. The latter in turn drives the drive system 8.

Computer directed path control systems are also known in which the reference input computer itself performs a preliminary interpolation of the three dimensional trajectory, while an interpolator following the computer for each feed axis performs a post-interpolation. In the known computer directed path control systems of numerically controlled machine tools, however, the reference input computer is followed in every case by one interpolator per feed axis, which is realized as a separate circuit, and which is followed in turn by a position controller, which is likewise realized as a separate circuit.

SUMMARY OF THE INVENTION

It is an object of the present invention to simplify a path control and regulating apparatus of the above-mentioned type.

According to the present invention, this problem is solved by the following features:

(a) The computer includes an interpolating means, which resolves the determined three dimensional trajectory by way of interpolation completely into axial, velocity-proportional feed increments and forms digital position reference values, (b) The computer includes an additional input unit for digital actual position values of the feed axis drives, and (c) The computer includes discrete position control means which compare the digital position reference values with the actual digital position values and form reference values for the speed control loop of the respective feed axis drive in accordance with predetermined control parameters.

In the path control apparatus according to the present invention, the interpolation means furnish, with little space required, a velocity proportional interpolation result which is free of rounding-off and expansion errors and is suitable for driving digital position control loops directly. The digitalizing of the position control loops allows the use of a computer as a true controller. In this connection, numerical measuring system conversion, numerical trailing delay distance formation and a numerical control algorithm can be set in as a program in accordance with the control requirements. In addition, numerical monitoring of the position control loops and the measuring systems can be performed in a simple manner, in which it is possible to provide, for instance, trailing distance limiting in case of servo errors, an acceleration stop, preservation of the actual value in case of an emergency shutdown and jamming error detection, as well as a numerical error compensation, for instance, backlash compensation or drift compensation. Implementation becomes quite simple through the use of a microcomputer, for example.

DETAILED DESCRIPTION OF THE INVENTION

Figure 2:
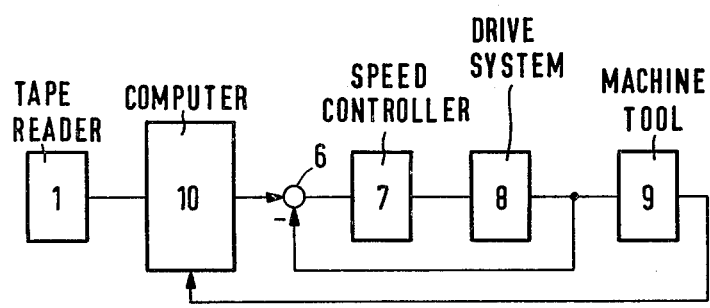
FIG. 2 is a similar block diagram of the computer directed path control apparatus according to the present invention.

FIG. 2 shows the structure of the computer directed path control according to the present invention for a numerically controlled machine tool. The reader again feeds the information stored in a perforated tape or a magnetic tape into a computer 10 during a programmed operating cycle. The computer 10 has an additional input unit for the actual position values of the individual feed axis drives. The computer 10 again decodes the data fed in and determines therefrom the three dimensional trajectory to be traversed. According to the present invention, however, the computer also performs an interpolating resolution of the path trajectory into the velocity proportional travel-distance increments of the feed axes involved and determines discrete position reference values. An interpolating method which is based on the well-known principle of direct function calculation is found to be particularly advantageous. Instead of fixed, determined smallest distance units as interpolation increments, however, there are used in the apparatus according to the present invention, path velocity proportional travel distance increments, which are determined by a search step method down to an accuracy smaller than the smallest distance unit. The interpolation algorithms obtained in this manner turn out to be particularly well suited for computers due to their recursive nature. The computer 10, finally, also compares the determined position reference values with the actual position values according to predetermined control criteria and control parameters. The output data of the computer 10 represent speed reference values for the respective speed control loops and the speed controllers 7 and feed drives 8 associated with them. The speed reference values determined by the computer 10 are compared with the actual speed values of the individual feed axis drive systems 8 in comparators 6 and drive their speed controllers 7, which in turn control the drive systems 8.

Figure 1:
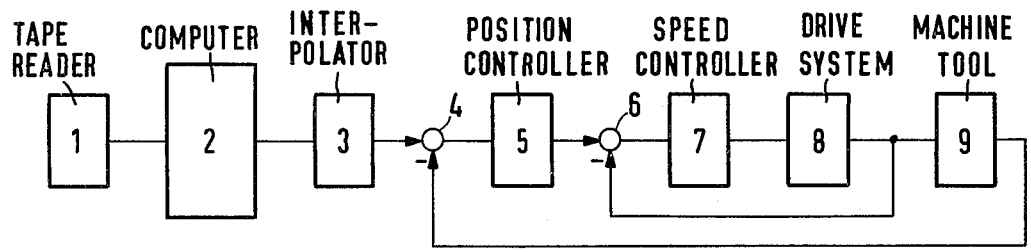
FIG. 1 is a block diagram of a prior art computer directed path control apparatus.

Contrary to the known computer directed path control of a numerically controlled machine tool shown in FIG. 1, the computer 10 in the computer directed path control system according to the present invention shown in FIG. 2, takes over the complete interpolation of the three dimensional trajectory and, in particular, also true control problems. The computer resolves the three dimensional trajectory by way of interpolation into its axial increments in the individual feed axes and carries out the complete path control for each axis. In a computer directed path control system according to the present invention, an interpolator realized by a circuit, a position controller realized by a circuit as well as all monitoring and compensation devices realized by circuits can therefore be omitted. They are replaced by appropiate programming of the computer.

Continuous position control is replaced by discrete position control, as the output frequency of the computer 10 cannot reach the output frequency of a position control system which is realized by circuitry and uses, for instance, parallel operation, if the computer must execute all the requirements mentioned. However, from a control engineering and system theory point of view, this high information output frequency is not necessary at all.

The transition from continuous position control to discrete position control for a path control system is possible if certain time and frequency conditions between the speed control loops and the computer supplying them with speed reference values are observed. If these conditions are observed, one can speak of a "quasicontinuous" transfer behavior, in which the transfer behavior of the digital i.e. discrete system does not differ in the region of interest from the transfer behavior of a continuous system, or only negligibly so.

As a system defining characteristic of a computer controlled discrete position control loop the ratio of the sampling frequency to the limit of the natural frequency of a discrete position control loop, in which the condition of quasicontinuous transfer behavior is still met can be considered. This condition can be considered as sufficiently met for a ratio larger than 8. As compared with this condition, those time conditions, which are required by the geometry, the accuracy of the digital interpolation and the information preprocessing as to the discrete determination of position reference values are in general far less system determining.

It follows from these considerations that the sampling time required for control engineering reasons of a discrete position control loop determines the maximum computing cycle time as well as the priority structure of the computer program. The computing cycle time is understood to be that time after which certain computing algorithms must be executed again in the system related operating cycle. It is necessary that the total minimum computing cycle time of the respective actuated parts of the system be shorter than the sampling time of the fastest position control loop, which is required from control-theory considerations.

Figure 3:
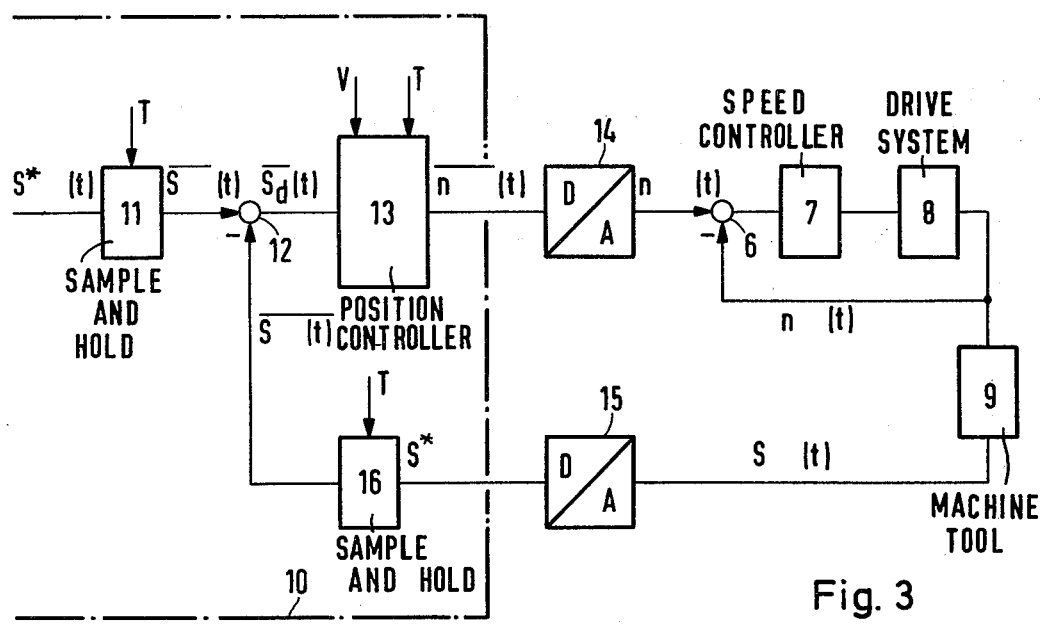
FIG. 3 is a control engineering model of computer apparatus according to the present invention.

FIG. 3 shows the structure of a control engineering model of a discrete position reference value processing system in a computer directed machine tool control system according to the present invention. The actual analog position value $S_{ist}(t)$ taken off at the work performing machine 9 is converted into a digital actual position value $S_{ist}(t)$ in an analog to digital converter 15. The continuously arriving digital actual position value is sampled by a sample and hold member 16 at the times $t = \nu T$, where t is the actual time, T the period between samples and $\nu$ the sample number e.g., $\nu z$ 1, 2, 3 - - - n and is stored over the following sample period T. A discrete, stored position actual value $\overline{S_{ist}}(t)$ in the form of a staircase function is produced.

In the same manner, a digital position reference value $S_{soll}(t)$ is sampled by a further sample and hold member 11 at the time $t = \nu T$ and stored over the following sampling period. The sample and hold member 11 generates a discrete, stored position reference value $\overline{S_{soll}}(t)$ in the form of a staircase curve.

In a comparator 12, the discrete, stored position reference value $\overline{S_{soll}}(t)$ is compared with the discrete, stored actual position value $\overline{S_{ist}}(t)$ in order to obtain a discrete, stored trailing distance $\overline{S_d}(t)$. The equation (1) applies:

$$\overline{S_d}(t) = \overline{S_{soll}}(t) - \overline{S_{ist}}(t) \tag{1}$$

The discrete, stored trailing distance $\overline{S_d}(t)$ is fed to a discrete position controller 13 with a gain V. The discrete position controller 13 generates a discrete, stored speed reference value $\overline{n_{soll}}(t)$ according to Eg. (2):

$$\overline{n_{soll}}(t) = V \cdot \overline{S_d}(t) \tag{2}$$

The discrete, stored speed reference value $n_{soll}(t)$ is converted by a digital to analog converter 14 into an analog actual speed value $\overline{n_{soll}}(t)$ and is compared in the comparator 6 at the input of the speed controller 7 with an actual analog speed value $n_{ist}(t)$ taken off at the drive system 8.

Figure 4:
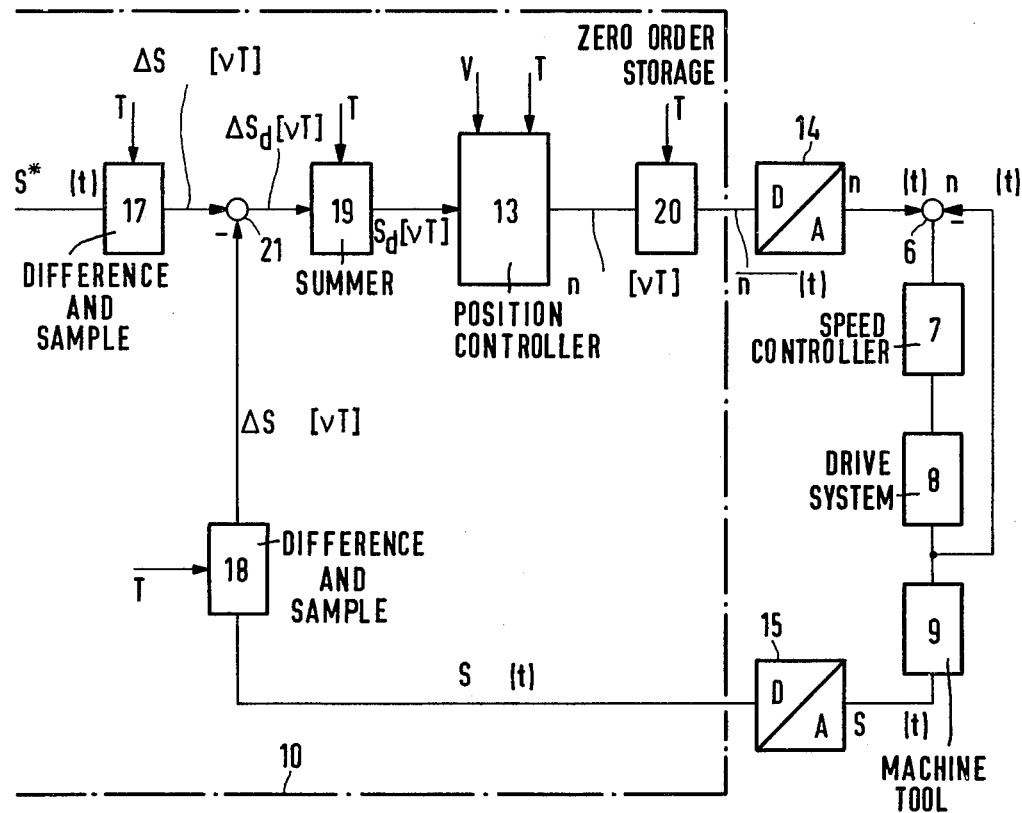
FIG. 4 illustrates the structure of a computing model of computer apparatus according to the present invention.

The control engineering model shown in FIG. 3, which is described by Eqs. (1) and (2), of a discrete position reference processing system, while describing the control process, does not describe the computing cycle required for this purpose in the computer 10. FIG. 4 shows the structure of a computing model of a discrete position reference processing system in a computer directed machine tool control system according to the invention. The blocks designated with 17 and 18 represent difference forming and sampling members for the operations which are cyclical in $t = \nu T$. The block designated 19 represents a summing member in $t = \nu T$. The block designated 20 is a zero-order storage member, e.g., a register.

The digital position reference value $S_{soll}(t)$ is converted by the difference forming and sampling member 17 into a discrete position reference value difference $\Delta S_{soll}(\nu T)$, i.e., it computes the difference between the previous sample taken at $t = nT$, for example with the sample at $(n+1)T$, for example. In a similar manner, the digital actual position value $S_{ist}(t)$ is converted by the difference forming and sampling member 18 into a discrete actual position value difference $\Delta S_{ist}(\nu T)$. In the comparator 21, the discrete position reference value difference $\Delta S_{soll}(\nu T)$ is compared with the discrete actual position value difference $\Delta S_{ist}(\nu T)$ in order to obtain a discrete trailing distance difference $\Delta S_d(\nu T)$. The discrete trailing distance differences are summed in the summing member 19 to form a discrete trailing distance $S_d(\nu T)$, which is fed to the discrete position controller 13. In other words summing member 19 performs the following operation:

$$S_d(\nu T) = \sum_{o}^{\nu} (\Delta S_{soll}(\nu T) - \Delta S_{ist}(\nu T)) \qquad (3)$$

where $S_{soll}(\nu T)$ is a velocity-dependent position reference value information.

The speed reference value $n_{soll}(\nu T)$ generated by the discrete position controller 13 is routed via the zero-order holding member 20, the output signal of which represents the discrete, stored speed reference value $n_{soll}(t)$. The latter is read out by the computer and is converted in a digital to analog converter 14 into an analog speed reference value $\overline{n}_{soll}(t)$, which is compared in the already described manner with an analog actual-speed value in the comparator 6 of the speed controller.

What is claimed is:

1. In a path control apparatus for the computer directed control of a numerically controlled machine tool with controlled drives in the feed axes, wherein the computer determines the trajectory to be run from input data, the improvement comprising:
    (a) the computer including means for interpolating which resolve the determined three dimensional trajectory by way of interpolation completely into axial, velocity proportional feed increments and forms digital position reference values,
    (b) the computer including an additional input unit for digital actual position values of the feed axis drives, and
    (c) the computer including means for discrete position control for each controlled feed axis drive which compare the digital position reference values with the digital actual position values and from reference values for the speed control loop of the respective feed axis drive comprising:
        (1) a first difference forming and sampling means for converting a digital position reference value ($S_{soll}(t)$) into a discrete position reference value differences ($\Delta S_{soll}(\nu T)$), and a second difference forming and sampling means for converting an actual digital value ($S_{ist}(t)$) into a discrete actual value position difference ($\Delta S_{ist}(\nu T)$),
        (2) comparison means having as inputs the discrete position reference value difference ($\Delta S_{soll}(\nu T)$) and the discrete actual position value difference ($\Delta S_{ist}(\nu T)$) and forming a discrete trailing distance difference ($\Delta S_d(\nu T)$),
        (3) summing means having as an input the discrete trailing distance difference ($\Delta S_d(\nu T)$) and forming a discrete trailing distance ($S_d(\nu T)$),
        (4) position controlling means having as an input the trailing distance ($S_d(\nu T)$) for forming a discrete speed reference value ($n_{soll}(\nu T)$), and
        (5) zero-order holding means having as an input the discrete speed reference value ($n_{soll}(\nu T)$) for forming a discrete, stored speed reference value ($\overline{n}_{soll}(t)$) for delivery to the speed control loop of the respective feed axis drive; and
    (d) means for synchronously operating said means for discrete position control.

* * * * *